United States Patent
Zhang et al.

(10) Patent No.: US 9,586,528 B2
(45) Date of Patent: Mar. 7, 2017

(54) STORAGE ASSEMBLY FOR USE WITH VEHICLE STORAGE PLATFORM

(71) Applicant: FORD GLOBAL TECHNOLOGIES, LLC, Dearborn, MI (US)

(72) Inventors: Peter Zhang, Nanjing (CN); Frank Hu, Nanjing (CN); Tom Xu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/880,514

(22) Filed: Oct. 12, 2015

(65) Prior Publication Data

US 2016/0137135 A1   May 19, 2016

(30) Foreign Application Priority Data

Nov. 13, 2014   (CN) .......................... 2014 1 0641783

(51) Int. Cl.
| | | |
|---|---|---|
| *B60N 3/00* | (2006.01) | |
| *B60R 7/00* | (2006.01) | |
| *B60R 7/02* | (2006.01) | |
| *B60R 5/04* | (2006.01) | |

(52) U.S. Cl.
CPC .............. *B60R 7/005* (2013.01); *B60R 5/044* (2013.01); *B60R 7/02* (2013.01)

(58) Field of Classification Search
CPC ............ B60R 7/005; B60R 5/044; B60R 7/02
See application file for complete search history.

(56) References Cited

U.S. PATENT DOCUMENTS

| | | | |
|---|---|---|---|
| 6,401,995 B1 * | 6/2002 | Yuille ....................... | B60R 7/02 220/483 |
| 7,350,681 B2 | 4/2008 | Polburn et al. | |
| 2013/0181472 A1 | 7/2013 | Nakajima et al. | |
| 2013/0221697 A1 | 8/2013 | Steinbrecher | |

FOREIGN PATENT DOCUMENTS

| | | |
|---|---|---|
| CN | 102933426 | 2/2015 |
| DE | 102010052957 | 5/2012 |
| EP | 667260 A1 * | 8/1995 |

OTHER PUBLICATIONS

Cargo Net, www.cargogear.com, total 1 page.

* cited by examiner

*Primary Examiner* — Lori L Lyjak
(74) *Attorney, Agent, or Firm* — Mohr Intellectual Property Law Solutions, PC

(57) ABSTRACT

The present invention in one or more embodiments provides a storage assembly for a vehicle with a storage platform, where the storage assembly includes a retaining part including a retaining portion, the retaining part being at least pivotably connected to the storage platform, and an elastic part connected with the retaining part such that the elastic part exerts a pulling force the retaining part toward a rear of the vehicle.

20 Claims, 4 Drawing Sheets

STORAGE ASSEMBLY FOR USE WITH VEHICLE STORAGE PLATFORM

RELATED APPLICATION(S)

This application claims the benefit of Chinese New Invention Patent Application No.: CN201410641783.1, filed on Nov. 13, 2014, the entire contents thereof being incorporated herein by reference.

TECHNICAL FIELD

The present invention in one or more embodiments relates to a storage assembly, and more specifically, relates to a storage assembly for use with a vehicle storage platform.

BACKGROUND

In vehicle designs, storage platforms are often used for customers to store thereupon articles and items. Particularly in hatchback style vehicles, a rear package tray positioned above the trunk at the rear of the vehicle is often connected to, moves along with, and thus provides readily access to the trunk.

For example, publication DE 102010052957 A1 discloses a storage platform system, where articles are stored via a retainer connected to the storage platform.

SUMMARY

In one aspect, a storage assembly for use with a vehicle storage platform is provided, where the storage assembly includes a retaining part including a retaining portion and being at least pivotably connected to the storage platform, and an elastic part connected with the retaining part such that the elastic part exerts a pulling force the retaining part toward a rear of the vehicle.

The elastic part may include a spring.

The elastic part may include a connector for connection to the storage platform.

The elastic part may include a connector for connection to a portion of the vehicle independent of the storage platform.

The retaining part may further include a supporting portion connected to and being different in material than the retaining portion.

The supporting portion may include a pair of supports in pivot connection to the storage platform, the retaining portion being positioned between the pair of supports.

The elastic part may be connected to the retaining portion.

The retaining portion may include a side wing and a central retaining portion positioned next to the side wing. The elastic part may contact the side wing.

The retaining portion may include two or more sections, at least two of which being in telescopic relation to each other.

The storage platform may at least be a portion of a rear package tray of the vehicle.

The storage assembly may further include a locking part including first and second locking sections, the first locking section being connected to the retaining portion.

The retaining part may further include a support portion connected to and being different in material than the retaining portion, the first locking section being positioned at the support portion.

The retaining portion may be detachable from the storage platform of the vehicle.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein.

DETAILED DESCRIPTION OF ONE OR MORE EMBODIMENTS

Figure 1:
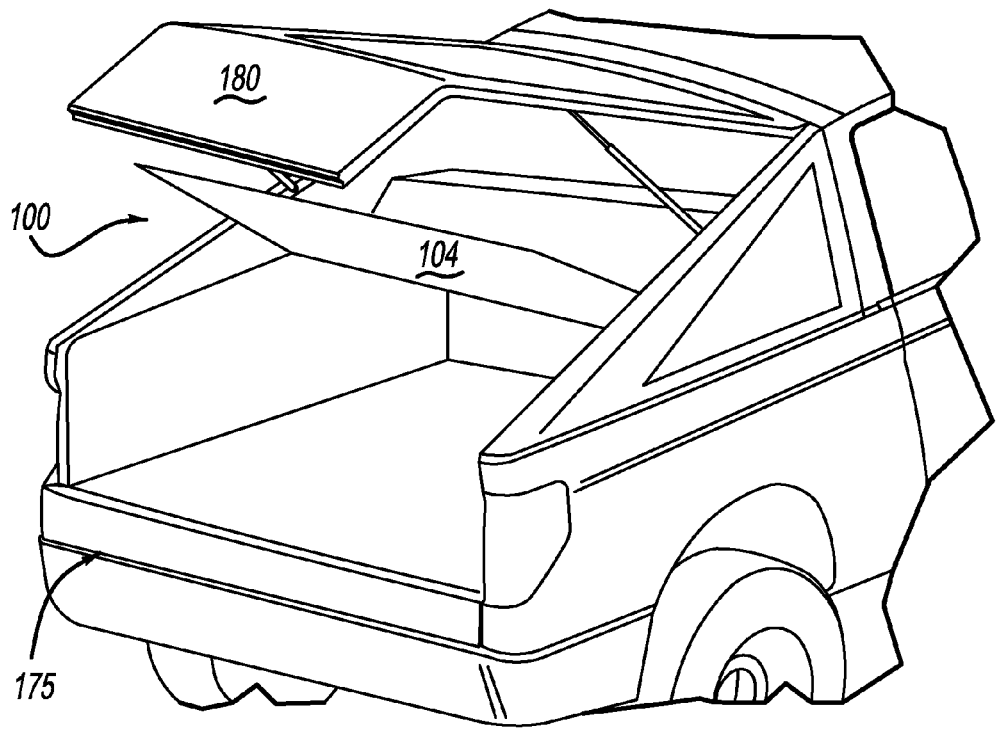
FIG. 1 illustratively depicts a storage assembly in relation to a vehicle according to one or more embodiments.

As referenced in the FIG.s, the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

As may be discussed herein elsewhere, the present invention in one or more embodiments is believed to be advantageous in providing a storage assembly for use with a vehicle storage platform, where relatively robust storage space may be provided, and articles as stored may be prevented from falling off of the storage platform when the vehicle changes speed, such as during braking, accelerating, or when the lift gate is being opened.

Figure 2A:
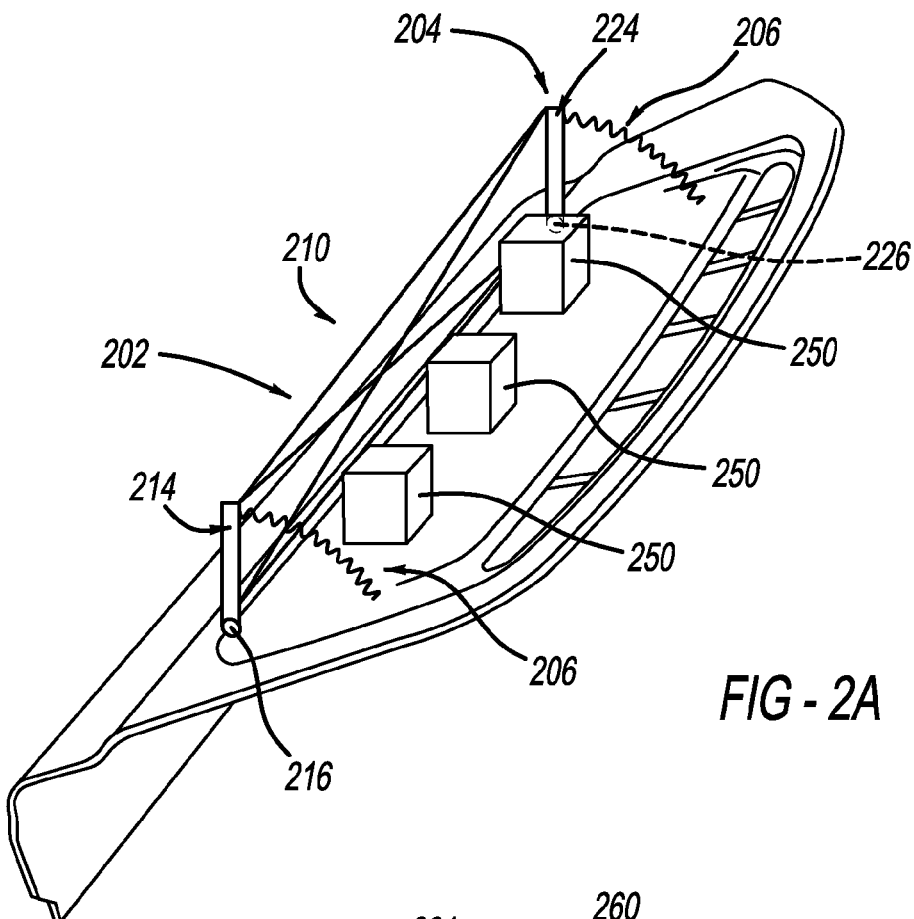
FIG. 2A illustratively depicts another view of the storage assembly referenced in FIG. 1, wherein the storage assembly is at a loading position.
Figure 2B:
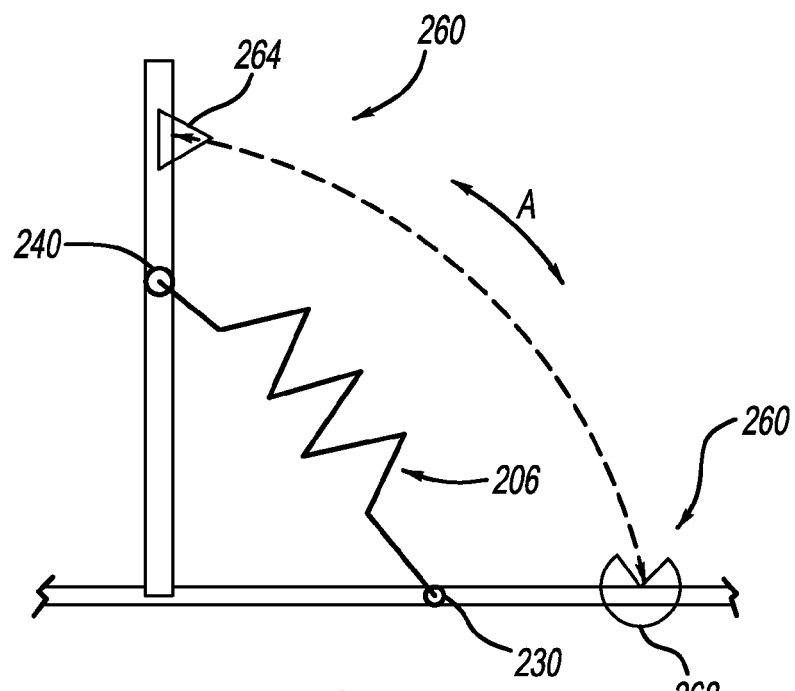
FIG. 2B illustratively depicts a partial side view of the storage assembly referenced in FIG. 2A.

FIGS. 1 through 2B illustratively depict several views of a storage assembly 100 of a vehicle 102 according to one or more embodiments of the present invention. The vehicle 102 includes a storage platform 104. The storage platform 104 is shown as being at least a part of a vehicle rear package tray of the vehicle 102. For purpose of illustration, the storage assembly 100 is described in relation to the storage platform 104 at the package tray of the vehicle 102. However, it is to be appreciated that the storage platform 104 may be positioned at one or more locations in the vehicle 102 where storage space is needed, including but not limited to at a control panel, a center console, a rear seat armrest and a floor of the vehicle 102.

Figure 3:
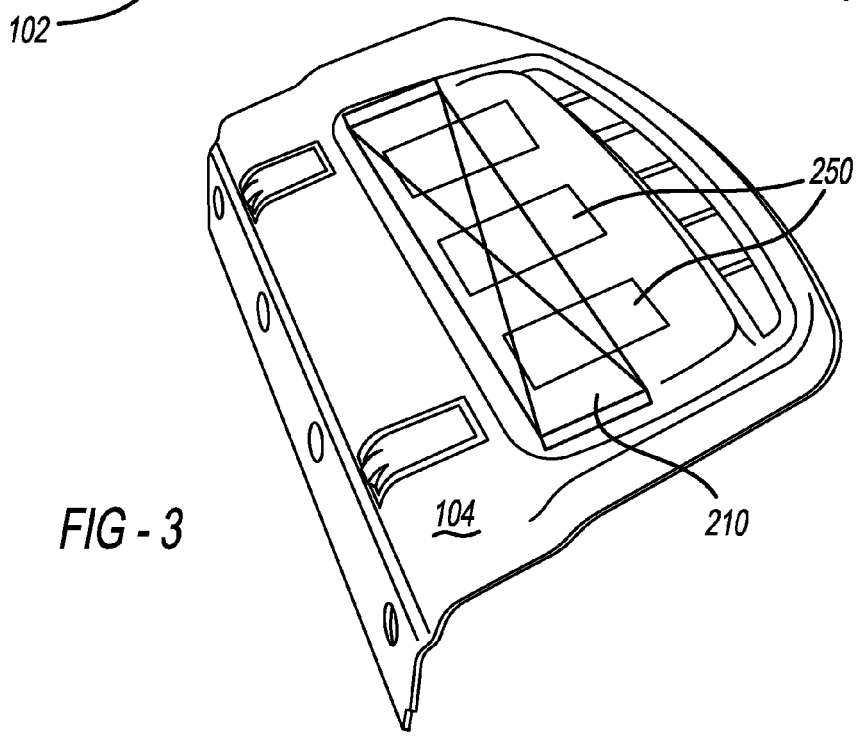
FIG. 3 illustratively depicts a top-down view of the storage assembly referenced in FIG. 1.

As is detailed herein elsewhere, and for certain vehicles such as those of hatchback styles, the storage platform 104 may be connected to and hence move along a rear door 180. Accordingly any article placed upon the storage platform 104 may engage in unwanted forward movement toward an anterior end of the vehicle 102 or even fall off of the storage platform 104 upon a sudden vehicle stop or a sudden lifting of the rear door 180. The storage assembly 100 in accordance with one or more embodiments of the present invention is believed to be particularly advantageous in reducing the occurrence likelihood of such an unwanted movement. More specifically, some of the benefits provided by the storage assembly 100 may be described further in view of FIG. 2A, FIG. 2B and FIG. 3.

Referring back to FIG. 2A and 2B, the storage assembly 100 is to be used with the storage platform 104 and includes a retaining part 210 and an elastic part 206, where the retaining part 210 being at least partially and pivotably connected along a direction A to the storage platform 104. The retaining part 210 includes a retaining portion 202. The elastic part 206 is connected with the retaining part 210 such that the elastic part 206 pulls the retaining part 210 toward a rear of the vehicle 102, and such that a sudden forward movement of any stored articles due to vehicle's deceleration or a lifting of the rear door 180 may be relatively prevented by the presence of the retaining portion 202.

Referring back to FIG. 2A, the storage assembly 100 is shown as in a loading position, where an article 250 is placed between the storage platform 104 and the retaining part 210. Since the article 250 may be of a relatively large volume, the retaining part 210 may pivot relative to the storage platform 104 toward a front end of the vehicle 102, causing the elastic part 206 to contract and to exert elastic force to the storage platform 104 and the retaining part 210. Because the storage platform 104 is loaded with the article 250, the storage platform 104 remains unmoved relative to the vehicle 102 due to the gravity of the article 250. Via an elastic force, the elastic part 206 pulls the retaining part 210 toward a rear end 175 of the vehicle 102, thereby holding the article 250 tightly. In this way, the article 250 may be stored robustly, and thus prevented from shaking with noise. Even when the lift gate 180 opens, the article 250 is not expected to fall off of the front end of the storage platform 104. Further, if the vehicle 102 brakes suddenly and thereby the article 250 has a relatively high acceleration relative to the storage platform 104, the retaining part 210 may pivot further toward the front end of the vehicle 102, and the elastic part 206 may extend further and provide a greater elastic force, such that the article 250 may eventually be kept in balance.

The retaining power of the storage assembly 100 is believed to be unique and further advantageous in that the retaining portion 102 is by default in a folded-down position via the elastic force exerted by the elastic part 206. Accordingly, the backward view is not necessarily blocked away from the vehicle operator under normal driving operations. Even under situations where a sudden deceleration or a sudden stop is commanded, the retaining portion 202 may swing forward only to the extent allowable via the elastic force from the elastic part 206. On the other hand, the mere fact that the retaining portion 202 is indeed able to move or swing forward along with the presence of the elastic part 206 provides space and motion cushion to the article 250 placed against the retaining portion 202 to avoid unnecessary surface-to-surface crashing or article-to-surface collision.

Referring back to FIG. 3, which illustratively depicts a top-down perspective view of the storage assembly 100 in one or more embodiments. In a folded-down position or under normal driving conditions, the retaining part 210 substantially engages the article 250 or the storage platform 104. Additionally and optionally, with the help of a locking part 260, the retaining part 210 may be maintained in this position. Accordingly, and because the retaining part 210 may snuggly engage the storage platform 104, a flat article such as documents or maps may be stored in the storage assembly 100. With this, adjustable storage space may be provided at the vehicle storage platform 104 to accommodate articles of different sizes.

The retaining portion 202 may take the form of a net structure as illustratively shown in FIG. 2A to provide visibility. This is particularly useful and beneficial when the storage assembly 100 is positioned at the package tray of the vehicle 102, where the driver may see through the net structure. During driving, the retaining part 210 is in a loading position, and the driver may see the rear of the vehicle 102 via a rear mirror without his vision to be blocked. In other embodiments, the retaining portion 202 may take other forms of flexible structures, such as plastic film, elastic fabric, rubber film, and the like. Without wanting to be limited to any particular theory, it is believed that these relatively softer materials not only help retain the articles to be stored but also conform well to a general outer contour of the articles such that the articles may be retained relatively more securely and gently.

Of course and in certain other embodiments, the retaining portion 202 may at least partially be of non-flexible structures, such as a plastic panel, a plastic cover, a metal panel, and the like. These relatively more sturdy and/or rigid materials may be particularly useful for retaining or storing articles with certain volume, weight and/or shape where sturdy support is desirable and sometimes necessary. Even with these relatively rigid materials, the retaining portion 202 may also be presented at least partially a net or mesh configuration to deliver certain level of flexibility and visibility.

In the event that the retaining portion 202 is supported with the use of a support portion 204 for connection to the storage platform 104, the retaining portion 202 may be made detachable relative to the support portion 204 via any suitable methods such as hooks, clips, or glides. In this detachable format, the retaining portion 202 may come in a set with variations in size, material and flexibility, and the user may pick and choose one of the set for connection to the supporting portion 204 and consequently to the storage platform 104.

Further, and as shown in FIG. 2A, the support part 204 may include a pair of support 214, 224 pivotably rotatable relative to the storage platform 104. The retaining portion 202 may be positioned between the pair of support 214, 224. In this way, the retaining portion 202 may pivot relative to the storage platform 104. In another one or more embodiments, the supporting portion 204 may include more or fewer supports, and/or the retaining portion 202 may be positioned relative to the supporting portion 204 differently.

As mentioned herein elsewhere, the supporting portion 204 may be connected to the retaining portion 202 to provide support, which is particularly advantageous in embodiments where the retaining portion 202 is flexible. For connection to the storage platform 104, it may be that the retaining portion 202 is connected to the supporting portion 204, which is in turn connected to and pivots about the platform 104. In this configuration, any section such as ends 216, 226 of the supporting portion 204 may each be employed as the pivot. Alternatively, the supporting portion 204 may further include a horizontal bar 230 optionally connecting the supports 214, 224 and functioning as a pivot for causing the retaining portion 202 to move along the direction "A" as illustratively depicted in FIG. 2B.

The supporting portion 204 may differ than the retaining portion 202 in material. For example, the retaining portion 202 may be of a net structure, while any section of the support portion 204 may include a plastic, metal, carbon or other rigid material. Alternatively, the retaining portion 202 and the support portion 204 may be formed integral for instance by polymer molding.

Referring back to FIG. 2A and FIG. 2B, and in one or more embodiments, the elastic part 206 may be of or include a spring. It is to be appreciated that the elastic part 206 may be of or may include other structures, such as an elastic rope, a rubber belt, or any other suitable elastic devices. The elastic part 206 may be of an elastic hinge (not shown) to connect the retaining part 210 to the storage platform 104, thereby the retaining part 210 may be supported by the structural strength of the elastic hinge and the need for other elastic devices may be reduced or even eliminated. In this way, more storage space on or above the storage platform 104 may be available for use.

Although two elastic parts 206 are shown in FIG. 2A as being connected to each support 214, 224, it is to be appreciated that more or fewer elastic parts may be utilized and/or these elastic parts may be connected to various locations of the retaining part 210 as described herein elsewhere. For example, each of the two supports 214, 224 may be connected with one or more elastic parts.

Optionally and as illustratively depicted in FIG. 2B, the elastic part 206 may include a first connector 230 connected to the storage platform 104. The first connector 230 may be positioned at the end of the elastic part 206 adjacent to the storage platform 104. In this way, the elastic part 206 may be connected to the storage platform 104 via the first connector 230. As described herein elsewhere and illustratively depicted in FIG. 4D, the elastic part 206 may be connected to other parts of the vehicle 102 by itself or via its first connector 230. It is particularly advantageous in that the elastic part 206 may be connected to other parts of the vehicle 102 rather than the storage platform 104, providing greater space efficiency and design flexibility.

Similarly, in another one or more embodiments, the elastic part 206 may include a second connector 240 via which the retaining part 210 is connected to the elastic part 206. With further reference to FIG. 2A, the second connector 240 may be connected to the support 214 of the supporting portion 204. With yet further reference to FIG. 4A, the second connector 240 may directly be connected to the retaining portion 202 of the retaining part 210.

Referring back to FIG. 2B, the storage assembly 100 may include the locking part 260. When the storage assembly 100 is in its folded-down position as illustratively shown in FIG. 3, the locking part 260 may secure the retaining part 210 with the storage platform 104, thereby the retaining part 210 may readily be held at the folded-down position. Optionally, the locking part 260 may include a first locking section 264 and a second locking section 268, which are connected to the retaining part 210 and the storage platform 104, respectively, and vice versa. With further reference to FIG. 2B, the first locking section 264 may be positioned at the supporting portion 204.

The second locking section 268 may be connected to other parts of the vehicle 102 other than the storage platform 104, such as a lift gate. In this way, the first and second locking sections 264, 268 may be engaged together to lock with each other in any suitable method. For example, the first locking section 264 may include a latch and the second locking section 268 may include a locking ring.

FIGS. 4A through 4D illustratively depict various views of the storage assembly 100 in accordance with one or more embodiments of the present invention.

Figure 4A:
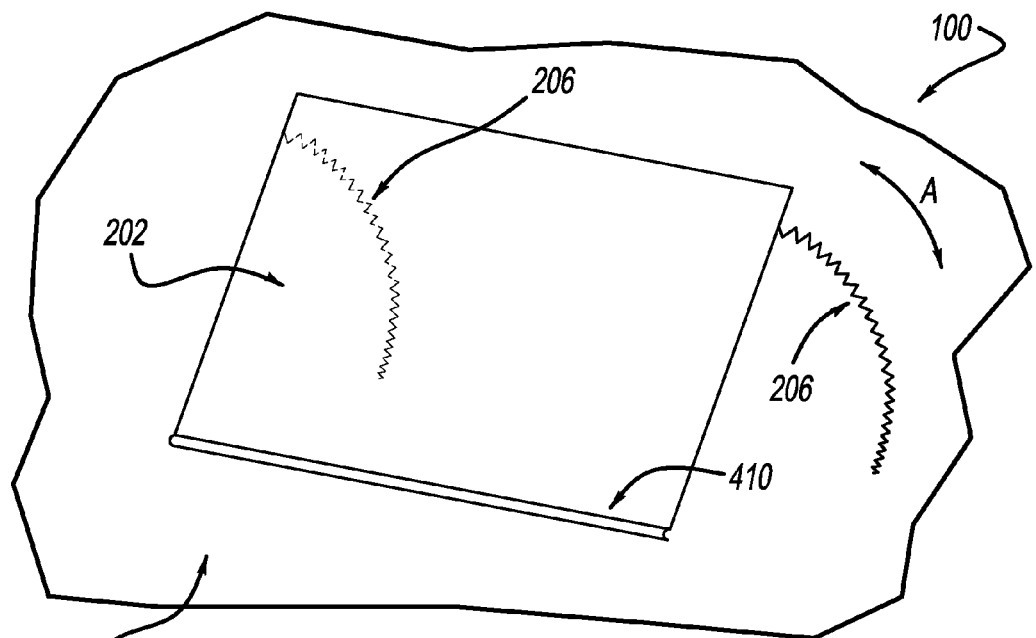
FIG. 4A illustratively depicts an alternative enlarged partial view of the storage assembly referenced in FIG. 2A.

As is mentioned herein elsewhere, in another one or more embodiments, the retaining part 210 may not need to include the supporting portion 204. For example, and in certain instances where the retaining portion 202 takes the form of a plastic cover, the retaining part 210 may not need to include the supporting portion 204 but may pivotably connect to the storage platform 104 directly. FIG. 4A illustratively depicts such a non-limiting view, where the retaining portion 202 is rigid enough to be connected to the storage platform 104 via a pivot connector 410 directly. In this way, the retaining part 210 may pivot relative to the storage platform 104 with or without the supporting portion 204. The pivot connector 410 may be configured as an elongated hinge, and may also be configured as a protrusion-recess connector wherein the protrusion (not shown) is provided to either one of the retaining portion 202 and the storage platform 104 and the recess (not shown) is provided to the other of the two. Accordingly the retaining portion 202 may be detachably connected to the storage platform 104 via engagement or disengagement of the protrusion to or from the recess.

Figure 4B:
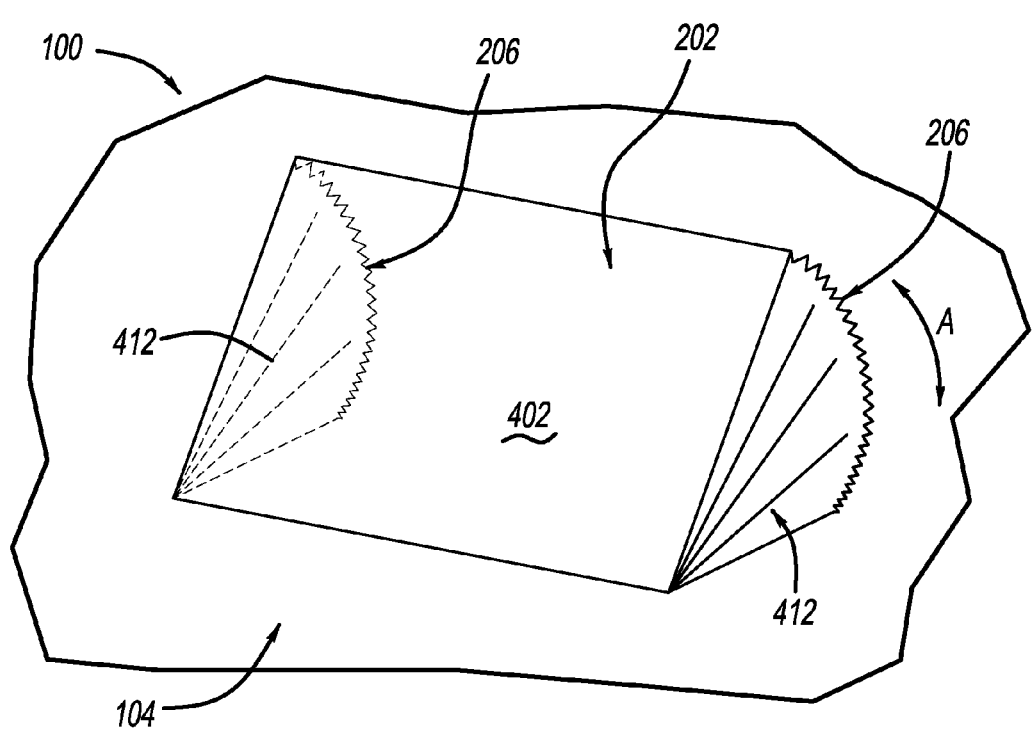
FIG. 4B illustratively depicts another alternative enlarged partial view of the storage assembly referenced in FIG. 2A.

In another one or more embodiments as illustratively shown in FIG. 4B, the retaining portion 202 may include two side wings 412 and a central retaining portion 402. The central retaining portion 402 may be positioned between the two side wings 412. The elastic part 206 may contact the side wings 412 so as to constantly exert a pulling force on the retaining portion 202 toward the storage platform 104. The side wing 412 may be of a flexible structure with resilience to provide greater space efficiency and to prevent the unnecessary use of the storage space. It is to be appreciated that other non-elastic structures may also be utilized, such as foldable structures, net structures, foldable rigid panels, and the like. In this way, any unwanted lateral movement of the article 250 relative to the storage platform 104 may further be restricted via the side wing 412, and thus providing more robust storage. In another one or more embodiments, more or fewer side wings 412 may be utilized, and/or the central retaining portion 402 may be positioned adjacent to the side wing 412.

Figure 4C:
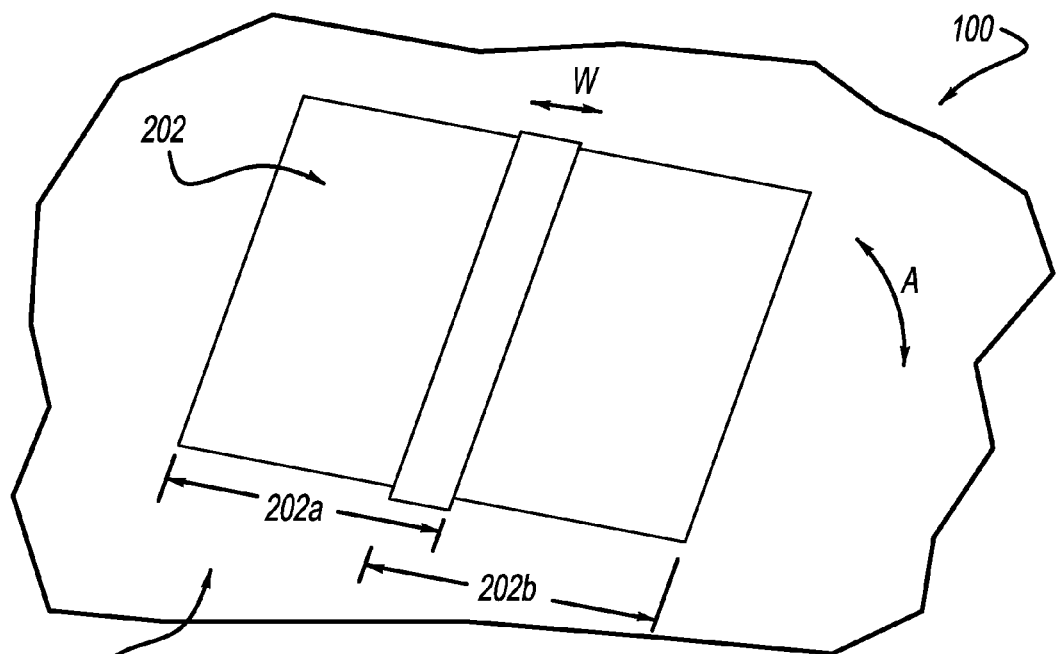
FIG. 4C illustratively depicts yet another alternative enlarged partial view of the storage assembly referenced in FIG. 2A.

In another one or more embodiments as illustratively shown in FIG. 4C, the retaining portion 202 may include a first section 202a and a second section 202b in telescopic relation to each other. For example, the first section 202a may be pivotably connected to the storage platform 104, and the second section 202b may be slidable relative to the first section 202a in a direction W. In this way, the retaining portion 202 with adjustable size may be provided to better accommodate the article 250 in variable sizes. Optionally, the first section 202a may be at least partially slidably received within the second section 202b. Alternatively, the first section 202a and the second section 202b may be connected to each other via a track and block structure. In other embodiments, the retaining portion 202 may include more than two sections, and at least two of the sections may be in telescopic relation to each other.

Figure 4D:
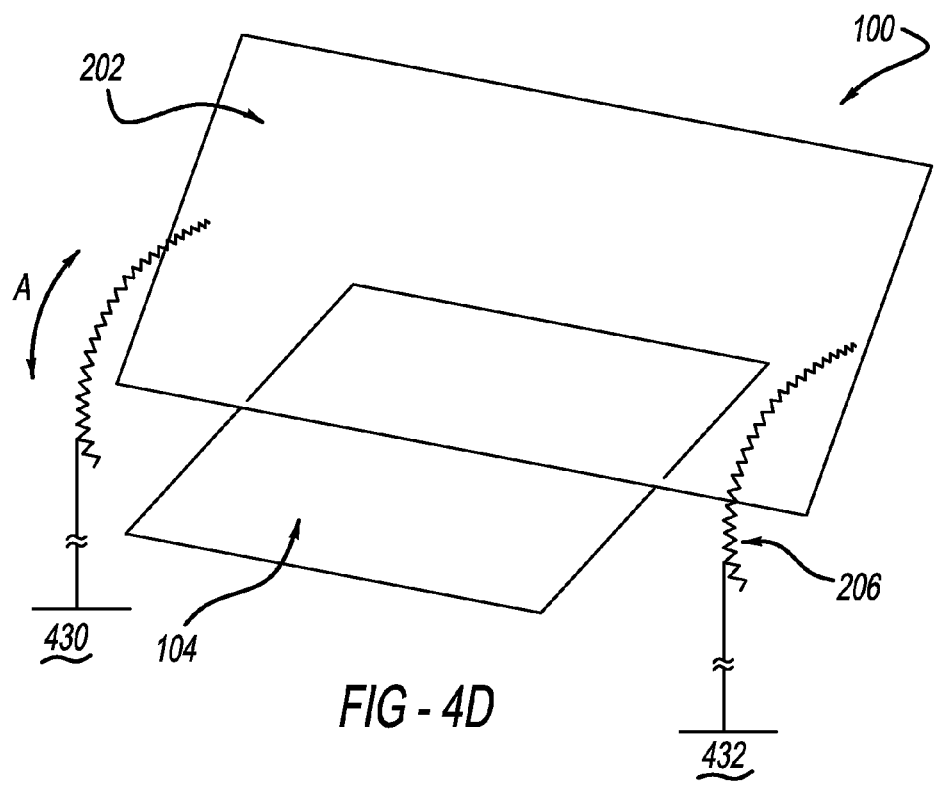
FIG. 4D illustratively depicts yet another alternative enlarged partial view of the storage assembly referenced in FIG. 2A.

In another one or more embodiments as illustratively shown in FIG. 4D and as is detailed herein elsewhere, the storage assembly 100 may include two elastic parts 206, which may respectively be connected to two portions 430, 432, other than the storage platform 104, of the vehicle 102. It is to be appreciated that the portions 430, 432 may be of different or the same structure, such as a vehicle floor. This configuration may be particularly beneficial where the retaining portion 202 may be larger and wider than the storage platform to accommodate the confinement of certain elongated items such as fishing poles, hockey sticks or golf clubs. Another benefit of this configuration is that relatively more powerful elastic force may be realized via the attachment of the elastic part 206 to one or more portions 430, 432 which may be positioned vertically lower than the storage platform 104 itself.

In one or more embodiments, the present invention as set forth herein provides a storage assembly for use with a vehicle storage platform. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A storage assembly of a vehicle with a storage platform, comprising:
   a retaining part including a retaining portion, the retaining part being at least partially in pivot connection to the storage platform; and
   an elastic part connected to the retaining part such that the elastic part exerts a pulling force on the retaining part toward a rear of the vehicle.

2. The storage assembly of claim 1, wherein the elastic part includes a spring.

3. The storage assembly of claim 1, wherein the elastic part includes a connector for connection to the storage platform.

4. The storage assembly of claim 1, wherein the elastic part includes a connector for connection to a portion of the vehicle independent of the storage platform.

5. The storage assembly of claim 1, wherein the retaining part further includes a supporting portion connected to and being different in material than the retaining portion.

6. The storage assembly of claim 5, wherein the supporting portion includes a pair of supports in pivot connection to the storage platform, the retaining portion being positioned between the pair of supports.

7. The storage assembly of claim 1, wherein the elastic part is connected to the retaining portion.

8. The storage assembly of claim 1, wherein the retaining portion includes a side wing and a central retaining portion positioned next to the side wing.

9. The storage assembly of claim 8, wherein the elastic part contacts the side wing.

10. The storage assembly of claim 1, wherein the retaining portion includes two or more sections, at least two of which being in telescopic relation to each other.

11. The storage assembly of claim 1, wherein the storage platform is at least a portion of a rear package tray of the vehicle.

12. The storage assembly of claim 1, further comprising a locking part including first and second locking sections, the first locking section being connected to the retaining portion.

13. The storage assembly of claim 12, wherein the retaining part further includes a support portion connected to and being different in material than the retaining portion, the first locking section being positioned at the support portion.

14. The storage assembly of claim 1, wherein the retaining portion is detachable from the storage platform of the vehicle.

15. A storage assembly of a vehicle with a storage platform, comprising:
   a retaining part including a retaining portion, the retaining part being at least partially in pivot connection to the storage platform; and
   an elastic part including a spring with first and second connectors, wherein the elastic part is connected to the retaining part via the first connector and to the storage platform via the second connector such that the elastic part exerts a pulling force on the retaining part toward a rear end of the vehicle.

16. The storage assembly of claim 15, wherein the retaining portion includes a side wing and a central retaining portion positioned next to the side wing, and the elastic part contacts the side wing.

17. The storage assembly of claim 15, wherein the retaining portion includes two or more sections, at least two of which being in telescopic relation to each other.

18. A storage assembly of a vehicle with a storage platform, comprising:
   a retaining part including a retaining portion, the retaining part being at least partially in pivot connection to the storage platform; and
   an elastic part including a spring with first and second connectors, wherein the elastic part is connected to the retaining part via the first connector and to a portion of the vehicle other than the storage platform via the second connector such that the elastic part exerts a pulling force on the retaining part toward a rear end of the vehicle.

19. The storage assembly of claim 18, wherein the retaining portion includes a side wing and a central retaining portion positioned next to the side wing, and the elastic part contacts the side wing.

20. The storage assembly of claim 18, wherein the retaining portion includes two or more sections, at least two of which being in telescopic relation to each other.

* * * * *